United States Patent
Schaufler et al.

(10) Patent No.: US 12,187,623 B2
(45) Date of Patent: Jan. 7, 2025

(54) PROCESS FOR PRODUCING HAEMATITE PIGMENTS

(71) Applicant: LANXESS Deutschland GmbH, Cologne (DE)

(72) Inventors: Larissa Schaufler, Essen (DE); Anna Weber-Czaplik, Duesseldorf (DE); Carsten Rosenhahn, Kempen (DE); Christine Kathrein, Duesseldorf (DE)

(73) Assignee: LANXESS Deutschland GmbH, Cologne (DE)

( * ) Notice: Subject to any disclaimer, the term of this patent is extended or adjusted under 35 U.S.C. 154(b) by 698 days.

(21) Appl. No.: 17/419,587

(22) PCT Filed: Jan. 15, 2020

(86) PCT No.: PCT/EP2020/050844
§ 371 (c)(1),
(2) Date: Jun. 29, 2021

(87) PCT Pub. No.: WO2020/148302
PCT Pub. Date: Jul. 23, 2020

(65) Prior Publication Data
US 2022/0073366 A1    Mar. 10, 2022

(30) Foreign Application Priority Data
Jan. 17, 2019   (EP) .................................... 19152213

(51) Int. Cl.
*C01G 49/06*   (2006.01)
(52) U.S. Cl.
CPC .......... *C01G 49/06* (2013.01); *C01P 2004/64* (2013.01); *C01P 2006/12* (2013.01); *C01P 2006/63* (2013.01); *C01P 2006/80* (2013.01)
(58) Field of Classification Search
CPC ....... C01G 49/06; C09C 1/24; C01P 2004/64; C01P 2006/12; C01P 2006/63; C01P 2006/80; C01P 2006/64
See application file for complete search history.

(56) References Cited

U.S. PATENT DOCUMENTS

| 5,421,878 A | 6/1995 | Lerch et al. |
| 9,428,402 B2 | 8/2016 | Ketteler et al. |

FOREIGN PATENT DOCUMENTS

| CN | 101844815 A | 9/2010 | |
| CN | 102976413 B | 6/2014 | |
| DE | 4235944 A1 * | 4/1994 | ............. C01G 49/06 |

OTHER PUBLICATIONS

European Search Report from corresponding European Application No. 19152213, dated Jul. 5, 2019, two pages.
XP002792692,Week 201360, Thomson Scientific, London, GB, two pages [2013].

* cited by examiner

*Primary Examiner* — Anthony J Green
(74) *Attorney, Agent, or Firm* — Nicanor A. Kohncke; Christopher L. McDavid; Ewa M. Wozniak

(57) ABSTRACT

Process for producing a haematite pigment having an a* value greater than 20, especially greater than 25, CIELAB units measured as a full shade in alkyd resin to DIN EN ISO 787-25:2007, by reacting iron sulfate with oxygen in the presence of a pigment seed, characterized in that
  a) water comprising
    i) at least one pigment seed selected from the group consisting of FeOOH and $Fe_2O_3$ and
    ii) iron sulfate
  forms an initial charge and
  b) at least one alkaline earth metal carbonate, especially $CaCO_3$, $MgCO_3$, $CaMg(CO_3)_2$ or mixtures thereof and
  c) oxygen-containing gas
are added to the initial charge, where at least 95% by weight of the total amount of iron sulfate used in the process is present in the initial charge a) prior to addition of components b) and c).

13 Claims, No Drawings

PROCESS FOR PRODUCING HAEMATITE PIGMENTS

The invention relates to a process for producing haematite pigments.

The production of haematite pigments is already sufficiently well known. For example, a modified Penniman process is described in WO2013/045608, proceeding from a finely divided haematite seed, iron and an iron salt, preferably iron nitrate.

A seed synthesis can be found, for example, in DE 4235944 (=U.S. Pat. No. 5,421,878), proceeding from iron sulfate and NaOH as precipitant.

More favourable starting materials such as iron sulfate in particular are obtained in titanium oxide production, for example. Therefore, there are also already descriptions of iron oxides with use of iron sulfate. For example, CN102976413 and CN101844815 each disclose a process proceeding from a customary FeOOH seed, to which iron sulfate and $CaCO_3$ are added simultaneously. However, a disadvantage of this procedure is that good red pigments can be produced therewith only to a limited degree.

The problem addressed by the present invention was therefore that of providing an improved process for producing iron oxide pigments, especially with an improved red shade.

The invention therefore relates to a process for producing a haematite pigment having an a* value greater than 20, especially greater than 25, CIELAB units measured as a full shade in alkyd resin to DIN EN ISO 787-25:2007, by reacting iron sulfate with oxygen in the presence of a pigment seed, characterized in that
  a) water comprising
    i) at least one pigment seed selected from the group consisting of FeOOH and $Fe_2O_3$ and
    ii) iron sulfate
    forms an initial charge and
  b) at least one alkaline earth metal carbonate, especially $CaCO_3$, $MgCO_3$, $CaMg(CO_3)_2$ or mixtures thereof and
  c) oxygen-containing gas
  are added to the initial charge, where at least 95% by weight of the total amount of iron sulfate used in the process is present in the initial charge a) prior to addition of components b) and c).

Haematite Pigment
CIELAB Colour Loci

For the measurement of the colour properties of iron oxide red pigments, there are well-established test methods in which the colour of media coloured with iron oxide red pigments, such as plastic test specimens or paint systems, is measured.

Standard parameters that have become established for measuring the colour of iron oxide red pigments are the parameters of what is called the CIELAB colour space. Any perceptible colour is defined here in this three-dimensional colour space by the colour locus having the coordinates L* (lightness), a* (red-green value) and b* (yellow-blue value). The more positive an a* value is, the greater the intensity of the colour red, and the more positive a b* value, the greater the intensity of the colour yellow. By contrast, the more negative the b* value, the greater the intensity of the colour blue. As well as these parameters, the colour saturation Cab* (also called chroma, chromaticity or colourfulness) is often also reported. This value is found directly from the values a* and b*, and is the square root of the sum total of the squares of a* and b*. The values a*, b*, L*, and Cab* are dimensionless values that are typically referred to as "CIELAB units".

In the colour measurement of iron oxide red pigments, examination in a long-oil alkyd resin (to DIN EN ISO 11664-4:2011-07 and DIN EN ISO 787-25:2007) has become established for paint systems. A possible alkyd resin used was formerly Alkydal L 64 from Bayer. Other similar alkyd resins such as Worléekyd P 151 from Worlée Chemie GmbH are now being used.

The corresponding colour measurement in the plastic is effected, for example, in polyethylene (high-density polyethylene, HDPE) at a pigmentation level of 1% by weight.

Preferably, the haematite pigment produced by the process according to the invention has an a* value of 25.5 to 30 CIELAB units as a full shade, measured in alkyd resin to DIN EN ISO 787-25:2007.

Likewise preferably, the pigment produced by the process according to the invention has a b* value of less than 30 CIELAB units, preferably a value of 6 to 29 CIELAB units, as a full shade, measured in alkyd resin to DIN EN ISO 787-25:2007.

Preferably, the haematite pigments obtained by the process according to the invention contain an iron oxide content ($Fe_2O_3$) of greater than 95% by weight, especially greater than 99% by weight, based on the pigment.

Particle Size

The haematite pigments obtained by the process according to the invention have preferably been formed from primary particles that preferably have an average size of 0.05 to 0.5 and more preferably of 0.1 to 0.3 µm. Particle size can be ascertained, for example, by means of transmission electron micrographs (primary particles) or scanning electron micrographs (solids).

Composition

Preferably, the haematite pigment obtained by the process according to the invention is present in a composition containing gypsum ($CaSO_4 \times 2H_2O$) which is likewise formed. The composition preferably contains up to 70% by weight of gypsum ($CaSO_4 \times 2H_2O$), especially 1% to 70% by weight of gypsum, based on the composition. But it is preferable to reduce the gypsum content by subsequent separation of gypsum from the pigment. Preference is therefore given to a haematite pigment-containing composition having a gypsum content of 0% to 50% by weight, preferably of 1% to 30% by weight, especially of 10% to 30% by weight, based on the composition. Likewise preferably, the composition contains gypsum in an amount of less than 5% by weight, especially less than 1% by weight, based on the composition.

The invention therefore also relates to such a preferably solid composition obtained by the above process. The water content is preferably less than 2% by weight based on the composition.

Step a)

The initial charge can be obtained by simply mixing pigment seed and iron sulfate.

Component i)

The preferred pigment seed used is FeOOH, especially α-FeOOH, also known as goethite, or $Fe_2O_3$ which is known as haematite, or a combination of the two.

Preference is given to a pigment seed having a BET surface area of 40 to 200 m²/g, measured to DIN 66131. For FeOOH, especially α-FeOOH, preference is given especially to a BET surface area of 100 to 200 m²/g. For $Fe_2O_3$ pigment seeds, preference is given to BET surface areas in the range from 40 to 200 m²/g, especially of 40 to 150 m²/g.

Correspondingly, preference is given to the process according to the invention in which the pigment seed in the initial charge is FeOOH, especially α-FeOOH, which has a BET surface area of 100 to 200 m²/g, or Fe₂O₃ which has a BET surface area of 40 to 200 m²/g, measured in each case to DIN 66131.

Particular preference is given to the use of Fe₂O₃ as pigment seed. These can be produced, for example, as described in WO2013/045608. A preferred production of a finely divided haematite seed having a particle size of not more than 100 nm and a specific BET surface area of especially 40 m²/g to 200 m²/g, preferably of 40 to 150 m²/g, measured to DIN 66131, comprises at least the steps of a) providing a mixture of metallic iron and water at a temperature of 60 to 120° C.
b) adding dilute nitric acid to the mixture from step a)
c) separating the aqueous suspension of finely divided haematite from any unconverted metallic iron
d) optionally isolating the finely divided haematite from the aqueous suspension removed.

The criterion of particle size is preferably considered to be satisfied when 90% of the particles have a particle size of not more than 100 nm, more preferably of 30 nm to 90 nm.

The content of pigment seed in the initial charge prior to the addition of components b), especially of components b) and c), especially prior to addition of calcium carbonate, is preferably 1 to 20 g/l, especially from 2 to 15 g/l (calculated as Fe₂O₃).

Component ii)

Preferred iron sulfate is iron(II) sulfate heptahydrate FeSO₄×7H₂O. However, amounts stated in the context of this application, unless designated otherwise, relate to anhydrous FeSO₄.

Preferably, the iron sulfate content in the initial charge prior to the addition of component b), especially prior to addition of calcium carbonate, is 20 to 200 g/l, especially from 40 to 150 g/l.

The initial charge a) prior to addition of component b), especially of components b) and c), contains the pigment seed and iron sulfate preferably in a weight ratio of pigment seed to iron sulfate of 0.3:1.6, especially of 0.5:1.1.

Preferably, the total amount of iron sulfate used for production in the initial charge a) is used prior to addition of component b), especially prior to addition of components b) and c).

The iron sulfate used, which preferably comes from TiO₂ production, preferably contains a content of less than 2% by weight of other components.

Prior to addition of component b), especially prior to addition of components b) and c), the initial charge is preferably heated to a temperature of 75 to 100° C.

Step b)

The alkaline earth metal carbonate used is especially CaCO₃, MgCO₃, CaMg(CO₃)₂ or mixtures thereof. More preferably, the alkaline earth metal carbonate is used in the form of calcium carbonate, which is generally understood to mean calcium carbonates that also contain Mg, such as CaMg(CO₃)₂, especially limestone or dolomite (CaMg(CO₃)₂). Preferred calcium carbonate is CaCO₃. Preferred alkaline earth metal carbonate, especially calcium carbonate, has a particle size of 35 to 150 μm. The alkaline earth metal carbonate, especially calcium carbonate, in step b) can preferably be added to the initial charge in solid form, but preference is given to addition in the form of an aqueous suspension. Such a suspension contains the calcium carbonate preferably in an amount of 100 to 400 g/l, especially of 150 to 300 g/l.

The addition of alkaline earth metal carbonate, especially calcium carbonate, especially to the aqueous suspension is typically effected over a period of 1 to 30 hours.

Step c)

In addition, an oxygen-containing gas is added to the initial charge a), preferably by introduction into the initial charge. The oxygen-containing gas used is preferably air.

The oxygen-containing gas is added to, preferably introduced into, the initial charge preferably during the addition of alkaline earth metal carbonate of component b), but the addition may also commence beforehand.

Preference is given to a flow rate of air in l/h/mol Fe in solution of 5 to 100 l/h/mol Fe.

On completion of addition of component c), the reaction mixture can preferably be kept at the given temperature for a few more hours. Preferably another 0 to 8 hours should be added on completion of addition of c).

Other Matters

Preferably no elemental iron is used in the process. It is likewise preferable to use any iron salt other than iron sulfate only in an amount of less than 5% by weight, especially less than 3% by weight, based on iron sulfate (calculated as FeSO₄).

Workup

After the end of the reaction time, the suspension is preferably cooled down to room temperature, and the sediment is especially washed until the water has a conductivity of preferably less than 2200 μS. The solids are then generally filtered off and dried at 140° C. in an oven.

If the intention is to remove the gypsum, the suspension can be screened for the purpose, preferably through a fine screen, for example a screen having mesh size 71 μm. Thereafter, the product can further be washed with demineralized water, especially down to a conductivity of <2 mS/cm. In order to avoid blockage in the screen, the suspension on the screen is moved cautiously, preferably with a soft brush.

EXAMPLES

Test Methods
Testing of the Colour Values in Full Shade

The colour values in full shade were ascertained to DIN EN ISO 787-25:2007 using the test paste described below.

5 g of a thixotroped long-oil alkyd resin (WorléeKyd P 151) were applied to the lower part of a plate-type paint dispersion machine with plate diameter 240 mm, and the respective iron oxide red pigment was processed with the test paste to give a coloured paste with a pigment volume concentration (PVC) of 10%.

The test paste contains 95% by weight of alkyd resin (Worléekyd P151 from Worlée-Chemie GmbH, DE) and, as thixotroping agent, 5% by weight of Luvotix HAT (Lehmann & Voss & Co KG, DE). This is done by stirring the Luvotix into the alkyd resin that has been preheated to 70 to 75° C. and incorporating it at 95° C. until dissolution. The cooled paste is then rolled in a three-roll mill to free it of bubbles.

The red pigments were weighed out according to $$m_P = \frac{PVC * m_b * \rho p}{(100 - PVC) * \rho b}$$

$m_p$=mass of the iron oxide red pigment
PVC=pigment volume concentration
$m_b$=mass of binder
ρp=pigment density
ρb=binder density The finished paste was transferred to a paste plate and analysed by colorimetry using a Datacolor 600 colorimeter using the d/8° measurement geometry and the D65/10° illuminant with specular reflection (CIELAB colour space to DIN 5033 Part 7).

Comparative Experiment 1 (Analogous to CN102976413 A, Embodiment 1)

260 g of an α-FeOOH seed with a BET surface area of 105 m²/g (Ref. 1) are initially charged together with 1580 g of water in the reactor (for lack of other details in CN102976413, an α-FeOOH seed with a BET surface area obtained by customary methods in the order of magnitude of about 100 m²/g is assumed). The pH is adjusted to 4.0 with $H_2SO_4$ and the mixture is heated to 70-73° C. 500 g of $FeSO_4$ (calculated as anhydrous iron sulfate), 11 333 g of water and a further 90 g of the seed are added to the initial charge thus obtained. On attainment of a temperature of T=75° C., the supply of air is commenced (50 l/h, pH 2.0-2.5). Then a total of 2400 g of solid $FeSO_4$ (calculated as anhydrous iron sulfate) and 1573 g of solid $CaCO_3$ were added uniformly over a period of 20 h. For that purpose, 60 g of iron sulfate (calculated as anhydrous iron sulfate) and 39.3 g of $CaCO_3$ are added every 30 min. The air was supplied in the first 20 min of the addition at about 50 l/h, and for the rest of the time 75 l/h was introduced. After 20 h, air was introduced for a further 10 min and then the temperature was adjusted to 66° C. The pH was kept in the range of 2.8-3.5 and 766 g of $FeSO_4$ (see above) and 756 g of $CaCO_3$ (see above) were added uniformly over a period of 10 h. The air was added at a rate of 60 l/h.

Subsequently, the reaction mixture is cooled, and the solids obtained are filtered off by washing the sediment 3× with demineralized water and dried at 140° C. The gypsum formed was not removed. The analysis of the pigment obtained can be found in Table 1.

INVENTIVE EXAMPLES

Example 1

1a) Production of a Yellow Seed with a BET of 100 m²/g

A jacketed 30 litre glass laboratory reactor with Intermig stirrer, temperature measurement by means of a PT100 thermocouple, EMF, and pH measurement, heated by means of a Julabo SL thermostat, and controlled by means of a Siemens PCS7 process control system, was initially charged with 16 643 cm³ of $FeSO_4$ solution with c=100 g/l sparged with $N_2$ at 300 l/h, and heated up to 50° C. while stirring at n=800 min⁻¹ within 50 minutes. On attainment of the target temperature, the nitrogen sparging was ended and the metered addition of 2500 cm³ of NaOH, c=320 g/l, was commenced while sparging with air at 500 l/h, with a target pH of 5.0, keeping the temperature constant. A metering time of 402 minutes was followed by the further oxidation time under air at 500 l/h. Thereafter, the target pH was reset by means of $FeSO_4$ solution at the end of the experiment.

For the analysis data, 1 l of the finished seed suspension was washed by demineralized water on a suction filter (MN 218) to <200 μS/cm and dried in an air circulation drying cabinet at 90° C. overnight, comminuted and then passed through a 2 mm screen and analysed.

1b) Pigment Production

In a 30 litre reactor, demineralized water, iron sulfate solution and the α-FeOOH seed produced in Example 1a) having a BET surface area of 98 g/m² were combined. The resultant suspension (17 l) has an $FeSO_4$ concentration of 59.8 g/l and an α-FeOOH seed concentration of 3 g/l (calculated as $Fe_2O_3$).

The suspension is heated up to 85° C. As soon as the temperature has been attained, the air supply via a sparging coil is started at an air rate of 65 l/h, and 3.554 l of a $CaCO_3$ suspension (conc.=200 g/l) are added over a period of 6.5 h.

After 6.5 h, the reaction is ended. The $Fe^{2+}$ content as a measure of the conversion of the reaction is checked by means of cerimetry. The resultant haematite sediment is washed 3 times, filtered off and dried at 140° C. in an oven. The $CaSO_4$ formed as a by-product is not separated off. The analysis of the pigment can be found in Table 1.

TABLE 1

| Example | Seed | Seed BET[m²/g] | STY [g/l/h] | CIELab* colour values | | |
|---|---|---|---|---|---|---|
| | | | | L* | a* | b* |
| Ex. 1 | α-FeOOH | 98 | 3.4 | 40.2 | 21.7 | 19.2 |
| Comp. Ex. 1 | α-FeOOH | 105 | 3.5 | 61.3 | 15.1 | 42.5 |

By comparison with the process known from CN102976413, the process according to the invention leads to coloristically distinctly improved reds (higher a* value).

Example 2a

Production of a Haematite Seed Analogously to Example 2 of WO2013045608

The haematite seed was produced according to Example 2 of WO'608, choosing the total amount of nitric acid such that it corresponds to a calculated starting concentration not of 4.5% by weight but of 7% by weight in the reaction mixture. A seed having a BET surface area of 98 m²/g was obtained.

Example 2b

In a 30 liter reactor, demineralized water, iron sulfate solution and seed from Example 2a) are combined so as to result in 17 l of a suspension having an $FeSO_4$ concentration of 108 g/l and a haematite seed concentration of 8 g/l (calculated as $Fe_2O_3$).

The suspension is heated up to 85° C. As soon as the temperature has been attained, the air supply via a sparging coil is started at an air rate of 250 l/h, and 6.669 l of a $CaCO_3$ suspension (concentration 200 g/l) are added over a period of 7.5 hours.

After 7.5 h, the reaction is ended. The $Fe^{2+}$ content is checked by means of cerimetry. The resultant haematite sediment is washed 3 times, filtered off and dried at 140° C. in an oven. The $CaSO_4$ formed as a by-product (about 25% by weight) is not separated off. Space-time yield (STY)=5.4 g/l/h. The analysis of the pigment can be found in Table 2.

TABLE 2

| Experiment | Seed | BET [m²/g] | Fe²⁺ content after 7.5 h [g/l] | Yield[1] [%] | Colour values (full shade) | | |
|---|---|---|---|---|---|---|---|
| | | | | | L* | a* | b* |
| Example 2 | α-Fe₂O₃ | 98 | 0.0 | 100 | 36.3 | 28.9 | 19.8 |

[1] determined via Fe²⁺ content

Example 3

In a 30 liter reactor, demineralized water, iron sulfate solution and seed from Example 2a) are combined so as to result in a 17 l suspension having an FeSO₄ concentration of 108 g/l and a seed concentration of 8 g/l (calculated as Fe₂O₃).

The suspension is heated up to 85° C. As soon as the temperature has been attained, the air supply via a sparging coil is started at an air rate of 125 l/h, and 6.669 l of a CaCO₃ suspension (conc.=200 g/l) are added over a period of 7.6 hours.

The Fe²⁺ content is checked by means of cerimetry. The resultant haematite sediment is washed 3 times, filtered off and dried at 140° C. in an oven. The CaSO₄ formed as a by-product (about 15% by weight) is not separated off. STY=5.4 g/l/h (Fe₂O₃)

The analysis of the pigment can be found in Table 3.

TABLE 3

| Experiment | Seed | Seed BET [m²/g] | Fe²⁺ content after 7.5 h [g/l] | Yield[1] [%] | Colour values (full shade) | |
|---|---|---|---|---|---|---|
| | | | | | a* | b* |
| Example 3 | α-Fe₂O₃ | 98 | 0.0 | 100 | 36.1 | 28.1 | 18.5 |

[1] determined via Fe²⁺ content

Example 4

Example 4a

Production of a Haematite Seed Analogously to Example 2 of WO2013045608

The haematite seed was produced according to Example 2 of WO'608, choosing the total amount of nitric acid such that it corresponds to a calculated starting concentration not of 4.5% by weight but of 8% by weight in the reaction mixture. A seed having a BET surface area of 120 m²/g was obtained.

Example 4b

In a 30 liter reactor, demineralized water, iron sulfate solution and seed from Example 4a) were combined so as to result in 17 l of a suspension having an FeSO₄ concentration of 59.5 g/l and a seed concentration of 5 g/l (calculated as Fe₂O₃).

The suspension is heated up to 85° C. As soon as the temperature has been attained, the air supply via a sparging coil is started at an air rate of 66 l/h, and 3.295 l of a CaCO₃ suspension (conc.=200 g/l) are added over a period of 7.5 hours.

After 7.5 h, the reaction is ended. The Fe²⁺ content is checked by means of cerimetry. The resultant haematite sediment is washed 3 times, filtered off and dried at 140° C. in an oven. The CaSO₄ formed as a by-product (about 45% by weight) is not separated off. STY=3.4 g Fe₂O₃/l/h The analysis of the pigment can be found in Table 4.

TABLE 4

| Example | Seed | Seed BET [m²/g] | Fe²⁺ content after 7.5 h [g/l] | Yield[1] [%] | Colour values (full shade) | | |
|---|---|---|---|---|---|---|---|
| Example 4 | | 120 | 6.0 | 88 | 36.6 | 27.5 | 17.9 |

[1] determined via Fe²⁺ content

Example 5

In a 1.5 m³ reactor having steam heating, stirrer and pumped circulation device, 429 kg of water, 201 kg of iron sulfate solution (corresponding to 38 kg of iron sulfate, calculated in anhydrous form) and 37 kg of haematite seed suspension (corresponding to 3.7 kg of seed from Ex. 4a) are combined and heated to 85° C.

As soon as the temperature has been attained, the air supply via a sparging coil is started at an air rate of 2550 l/h, and 125 l of a CaCO₃ suspension (concentration=200 g/l) are added over a period of 7.5 hours.

After 7.5 h, the reaction is ended and the suspension is cooled down. The Fe²⁺ content is checked by means of cerimetry. The resultant haematite sediment is washed 3 times, filtered off and dried at 140° C. in an oven. In the case of a small amount, the CaSO₄ formed during the reaction was screened off with a screen (71 μm mesh) in order to obtain an iron oxide having a gypsum content of less than 1% by weight. The analysis of the pigment can be found in Table 5 (STY=3.5 g/l/h).

TABLE 5

| Experiment | Seed | Seed BET [m²/g] | Fe²⁺ content after 7.6 h [g/l] | Yield[1] [%] | Colour values (full shade) | | |
|---|---|---|---|---|---|---|---|
| | | | | | L* | a* | b* |
| Example 5 | α-Fe₂O₃ | 120 | | | 37.3 | 27.8 | 18.8 |
| Example 5 without CaSO₄ | α-Fe₂O₃ | 120 | 0.0 | 100 | 37.2 | 27.6 | 18.6 |

[1] determined via Fe²⁺ content

Comparative Example (Seed)

The seed synthesis from Example 1 of DE 4235944 (=U.S. Pat. No. 5,421,878) was reworked, and the a* value of the resultant seed was determined as in the other examples (see above). Example 1 here was
  a) reworked as described with NaOH and
  b) rather than NaOH the precipitant MgCO₃ was used in an equivalent amount (200.2 g/1124.8 g of water).

The colour values (L*, a* and b*) were determined by the same method as described above in full shade in the alkyd resin, and the following results were obtained:

| Example 1 of DE 4235944 (seed) | L* | a* | b* |
|---|---|---|---|
| a) NaOH | 45.9 | 17.4 | 25.9 |
| b) MgCO₃ | 34.1 | 11.9 | 13.5 |

The a* values, at 17.4 and 11.9, are well below the a* value of >20 of the present invention.

What is claimed is:

1. A process for producing a haematite pigment having an a* value greater than 20 CIELAB units measured as a full shade in alkyd resin to DIN EN ISO 787-25:2007, comprising the steps of
   (1) providing water comprising
      i) at least one pigment seed selected from the group consisting of FeOOH and $Fe_2O_3$ and
      ii) iron sulfate to form an initial charge (a) and
   (2) adding at least one alkaline earth metal carbonate (b) and oxygen-containing gas (c) to the initial charge,
wherein at least 95% by weight of the total amount of iron sulfate used in the process is present in the initial charge (a) prior to addition of components (b) and (c).

2. The process according to claim 1, wherein the iron sulfate content in the initial charge (a) prior to the addition of component (b) is 20 to 200 g/l.

3. The process according to claim 1, wherein the content of an FeOOH and/or $Fe_2O_3$ seed in the initial charge prior to the addition of component (b) is 1 to 20 g/l.

4. The process according to at claim 1, wherein component (b) is added to the initial charge at a temperature of 75 to 100° C.

5. The process according to claim 1, wherein component (b) is added to the initial charge in the form of an aqueous suspension.

6. The process according to claim 1, wherein the pigment seed in the initial charge is FeOOH with a BET surface area of 130 to 200 $m^2$/g or $Fe_2O_3$ with a BET surface area of 40 to 200 $m^2$/g.

7. The process according to claim 1, wherein the particle size of the pigment seed is not more than 100 nm.

8. The process according to claim 1, wherein the haematite pigment obtained has an iron oxide content ($Fe_2O_3$) of greater than 95% by weight, based on the pigment.

9. The process according to claim 1, wherein component (b) is added to the initial charge in the form of an aqueous suspension with a content of 100 to 400 g/l $CaCO_3$.

10. The process according to claim 1, wherein component (b) is $CaCO_3$, $MgCO_3$, $CaMg(CO_3)_2$ or mixtures thereof.

11. The process according to claim 1, wherein the pigment seed in the initial charge (a) is α-FeOOH with a BET surface area of 130 to 200 $m^2$/g.

12. The process according to claim 1, wherein the haematite pigment obtained has an a* value greater than 25 CIELAB units.

13. The process according to claim 1, wherein the haematite pigment obtained has an iron oxide content ($Fe_2O_3$) of greater than 99% by weight, based on the pigment.

* * * * *